Dec. 28, 1937.  W. W. BRADFORD, JR  2,103,242
AIRCRAFT PROPELLER
Original Filed Aug. 13, 1931  2 Sheets-Sheet 1
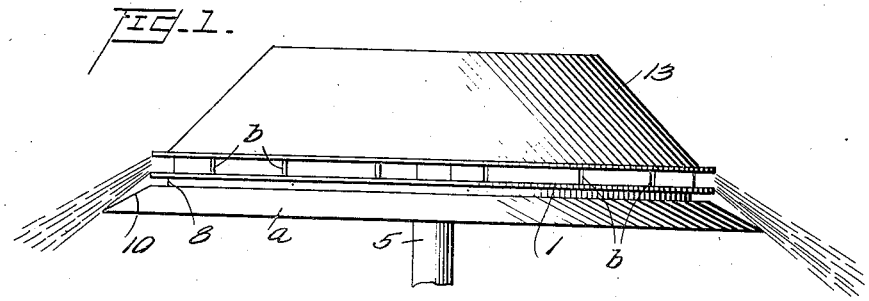
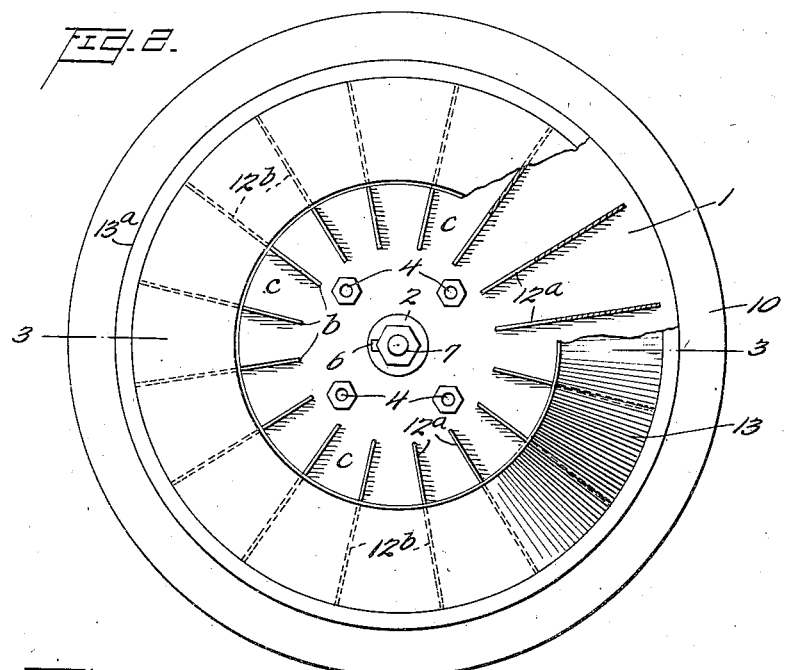
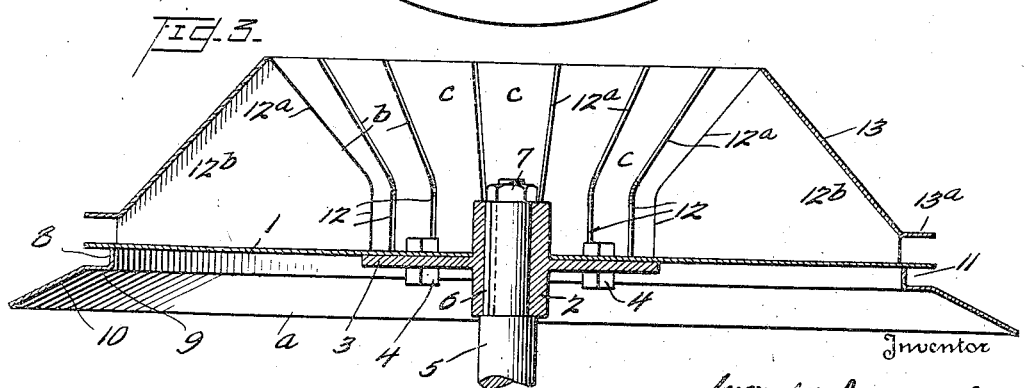

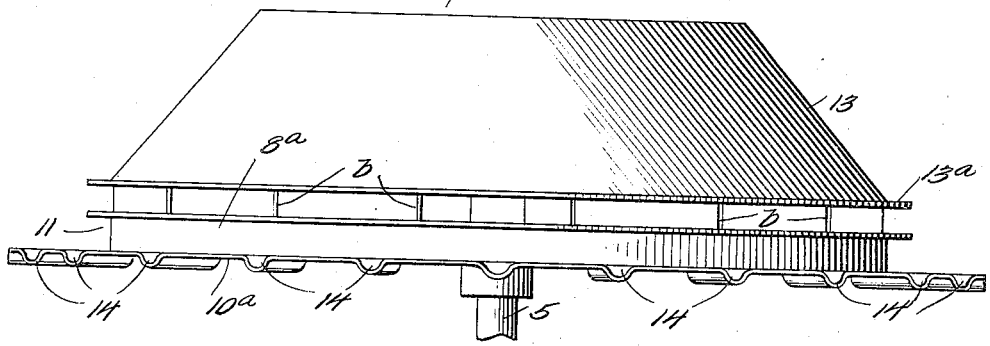
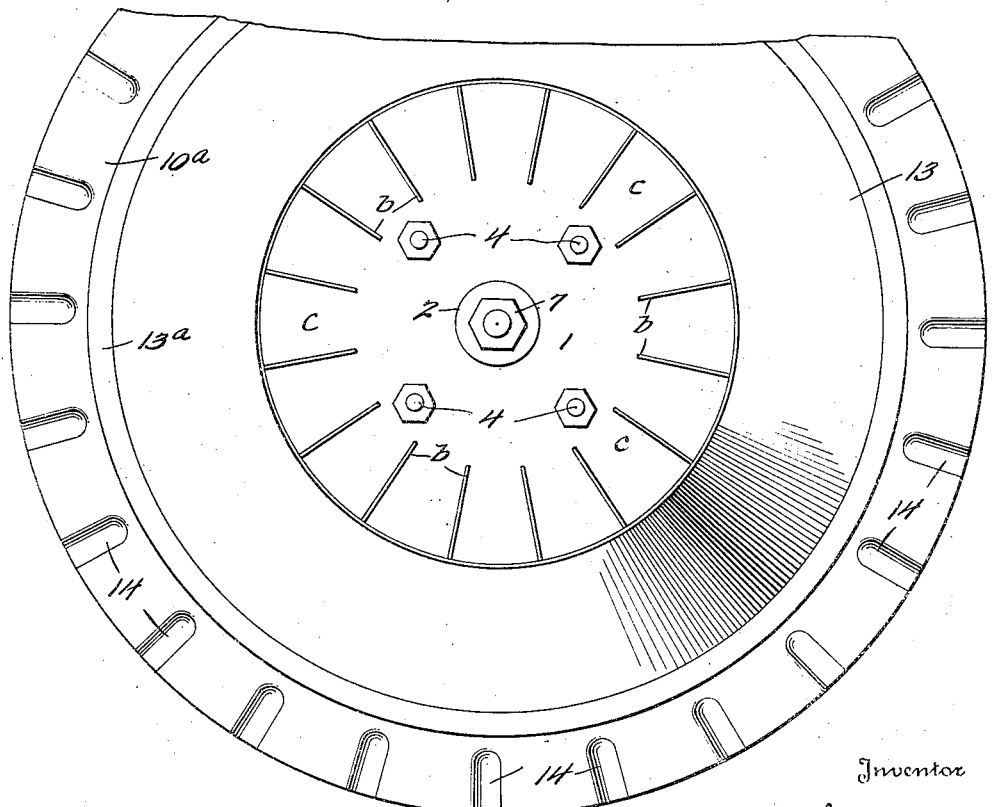

Patented Dec. 28, 1937

2,103,242

UNITED STATES PATENT OFFICE 2,103,242

AIRCRAFT PROPELLER

William W. Bradford, Jr., Bel Air, Md., assignor to Howard R. Hyle, Catonsville, Md., Eldridge Hood Young, Baltimore, Md., and Stanley Turner Holmes, Harford County, Md.

Substitute for application Serial No. 556,909, August 13, 1931. This application August 31, 1936, Serial No. 98,772

6 Claims. (Cl. 170—172)

This invention relates to propellers for airplanes, either for lifting or forcing the plane forward.

In carrying out the invention, I provide a flat disc or head which is secured to the propeller shaft, and attached to the upper or forward side of the disc are radial vanes, covered by a conical hood, except at the central part of the propeller, these vanes forming compartments into which air may enter freely at the central part of the propeller, each compartment having a restricted outlet through which the air is forced at high velocity in a radial direction. To the under side of the disc is attached a ring which projects outwardly beyond the disc, this ring being connected to the disc by an annular flange which is located a short distance from the periphery of the disc. The flange offsets the ring from the rear face of the disc so as to form an annular pocket between the disc and ring. In one form of the invention, this ring extends parallel with the disc to the periphery of the latter, and thence slopes rearwardly, and in another form, the pocket is made somewhat deeper and the ring extends parallel with the disc throughout. The ring may be plain, but preferably has radial corrugations, for a purpose to be hereinafter described.

In the accompanying drawings,

Fig. 1 is a side view of the propeller, the course of the air stream being indicated in dotted lines;

Fig. 2 is a plan view of the propeller;

Fig. 3 is a section on the line 3—3 of Fig. 2;

Fig. 4 is a side view of a modified form of propeller, and,

Fig. 5 is a plan view of the same, partly broken away.

This application is a substitute for my application Serial No. 556,909 filed August 13, 1931, which became abandoned on February 8, 1934.

Referring to Figures 1 to 3 of the drawings, the propeller comprises a flat supporting disc 1 having a central opening through which extends a hub 2 having a flange 3 to which the disc is secured by bolts 4. The propeller shaft 5 extends through the hub and is suitably secured thereto, as by a key 6 and nut 7. A sheet metal ring 10 is secured to the lower or under side of the disc by a flange 8 at the inner edge of the ring which offsets the latter from the disc. The flange is affixed to the disc a short distance inwardly from the periphery of the latter, as shown, thereby forming an annular pocket 11 between the disc and ring. The ring extends radially outward from the flange, as indicated at 9, as far as the outer edge of the disc, and thence inclines downwardly and outwardly from the disc as indicated at 10.

Upon the top or forward side of the disc are arranged a circular series of radial vanes $b$, these vanes being of general triangular shape, equally spaced apart and lying in planes perpendicular to the plane of the disc. As shown, the edges 12 of the vanes are spaced some distance from the hub 2 and extend upwardly from the disc, thence flaring outwardly as shown at $12^a$ thence downwardly and outwardly as shown at $12^b$ and inclines downwardly to the disc near the periphery of the latter. A conical hood 13 is secured to the edges $12^b$ and inclines downwardly to the ends of the vanes and thence extends parallel with the disc as far as the periphery of the latter, as indicated at $13^a$. The part $13^a$ is spaced a short distance from the disc, as shown. By this construction, a circular series of radially extending air channels $c$ is formed, these channels being deep at their inner edges and converging toward their outer ends to restricted outlets.

When the propeller shaft is rapidly rotated, the air in the channels, which may enter freely through their larger ends, is thrown out by centrifugal force with high velocity through the restricted ends of the channels and a lifting force is applied to the propeller. My theory of the operation of the propeller is that the high velocity air streams leaving the outlets of the channels past the pocket 11 cause a partial vacuum to be created in said pocket, and over the ring, and atmospheric pressure causes the high velocity air streams to be deflected downwardly over and past the inclined surface of the ring, the air streams and centrifugal force co-acting to remove the air pressure from the upper side of the ring, thereby creating a difference in atmospheric pressure on opposite sides of the ring and disc which tends to lift the propeller. I do not, however, wish to confine myself to any particular theory of operation.

In Figures 4 and 5 of the drawings, the structure is the same as in the preceding figures, except that the ring $10^a$, instead of being conical, as in said figures, is flat and lies parallel with the disc, and is offset from the disc by a deeper flange $8^a$. The ring is also shown with radial corrugations 14, which may be employed in either form of ring. For the same lifting power, it is necessary to make the pocket 11 deeper, as by lengthening the flange $8^a$, when the flat type of ring is used, than where the conical type is employed. The radial corrugations are found to increase the lifting force, possibly by assisting in causing the air to be thrown off of the ring by centrifugal force.

What I claim is:

1. An air-craft propeller comprising a shaft, a disc secured centrally to the shaft, a circular series of radially arranged members forming air channels on the forward side of the disc, said channels being open and relatively deep at their inner ends and converging to restricted outlets at the periphery of the disc, and a ring of sheet material connected to the rear side of the disc inwardly from the periphery of the disc and offset from the latter, said ring being concentric with the disc and projecting radially beyond the disc.

2. An air-craft propeller comprising a shaft, a disc centrally secured to the shaft, a circular series of spaced radial vanes projecting forwardly from the disc and having their outer edges inclined toward the periphery of the disc, a hood extending over said inclined edges and forming, with the vanes, radial air channels, the outer edge of the hood being close to the disc and forming therewith a restricted outlet for the channels, and a ring of sheet material concentric with the disc, secured to and spaced from the rear side of the disc and forming therewith an annular pocket near the periphery of the disc, said ring projecting radially beyond the disc.

3. An air-craft propeller comprising a shaft, a disc centrally secured to the shaft, a circular series of spaced radial vanes projecting forwardly from the disc and having their outer edges inclined toward the periphery of the disc, a hood extending over said inclined edges and forming, with the vanes, radial air channels, the outer edge of the hood being close to the disc and forming therewith a restricted outlet for the channels, and a ring of sheet material concentric with the disc, secured to and spaced from the rear side of the disc and forming therewith an annular pocket near the periphery of the disc, said ring projecting radially beyond the disc, and the part of said ring which extends beyond the margin of the disc being rearwardly inclined.

4. An air-craft propeller comprising a shaft, a disc centrally secured to the shaft, a circular series of spaced radial vanes projecting forwardly from the disc and having their outer edges inclined toward the periphery of the disc, a hood extending over said inclined edges and forming, with the vanes, radial air channels, the outer edge of the hood being close to the disc and forming therewith a restricted outlet for the channels, and a ring of sheet material concentric with the disc, secured to and spaced from the rear side of the disc and forming therewith an annular pocket near the periphery of the disc, said ring projecting radially beyond the disc, and the part of the ring which projects beyond the disc being radially corrugated.

5. An air-craft propeller comprising a shaft, a disc centrally secured to the shaft, a circular series of spaced radial vanes projecting forwardly from the disc, the edges of the vanes being spaced from the shaft and inclined forwardly and outwardly and thence rearwardly and outwardly and terminated a short distance from the periphery of the disc, a conical hood, forming with the vanes, a series of air channels, said hood extending over said rearwardly and outwardly inclined edges, said hood having its outer margin spaced a short distance from the disc and flared outwardly over the disc, forming therewith a restricted outlet for the air channels and a ring of sheet material, concentric with the disc, secured to and spaced from the rear side of the disc and forming therewith an annular pocket near the periphery of the disc, said ring projecting radially beyond the disc.

6. An air-craft propeller comprising a shaft, a disc secured centrally to said shaft, means on the disc for forcing air radially outward beyond the disc as the latter rotates, and a ring of sheet material connected to the rear side of the disc inwardly from the periphery of the disc and offset from the disc, said ring projecting radially beyond the disc.

WILLIAM W. BRADFORD, Jr.